US012794064B2

(12) United States Patent
Hirano et al.

(10) Patent No.: US 12,794,064 B2
(45) Date of Patent: Nov. 10, 2026

(54) POWER STORAGE MODULE

(71) Applicant: Panasonic Intellectual Property Management Co., Ltd., Osaka (JP)

(72) Inventors: Tatsuya Hirano, Osaka (JP); Hiroshi Takasaki, Osaka (JP); Momoko Hiranuma, Osaka (JP); Keisuke Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 518 days.

(21) Appl. No.: 18/552,195

(22) PCT Filed: Mar. 23, 2022

(86) PCT No.: PCT/JP2022/013357
§ 371 (c)(1),
(2) Date: Sep. 25, 2023

(87) PCT Pub. No.: WO2022/210137
PCT Pub. Date: Oct. 6, 2022

(65) Prior Publication Data

US 2024/0162546 A1 May 16, 2024

(30) Foreign Application Priority Data

Mar. 31, 2021 (JP) ................................. 2021-059682

(51) Int. Cl.
*H01M 50/242* (2021.01)
*H01G 11/10* (2013.01)
(Continued)

(52) U.S. Cl.
CPC .......... *H01M 50/242* (2021.01); *H01G 11/10* (2013.01); *H01G 11/78* (2013.01); *H01M 50/213* (2021.01); *H01M 50/291* (2021.01)

(58) Field of Classification Search
CPC ............. H01M 50/213; H01M 50/289; H01M 50/291; H01M 50/293
See application file for complete search history.

(56) References Cited

U.S. PATENT DOCUMENTS 5,578,392 A 11/1996 Kawamura
9,627,665 B1 * 4/2017 Hsu ..................... H01M 50/517
(Continued)

FOREIGN PATENT DOCUMENTS

CN 206697531 U 12/2017
CN 112005400 A 11/2020
(Continued)

OTHER PUBLICATIONS

International Search Report of PCT application No. PCT/JP2022/013357 dated Jun. 7, 2022.
(Continued)

*Primary Examiner* — Gregg Cantelmo
(74) *Attorney, Agent, or Firm* — Rimon P.C.

(57) ABSTRACT

A power storage module includes: at least one cylindrical power storage device; and an upper holder that holds the power storage device in an axial direction. The upper holder includes a container that houses the power storage device and a hole that penetrates the upper holder along an axial direction around the container. A distance between the container and the hole in plan view is smaller than a distance between the container and the adjacent container in plan view or a distance between the container and an edge of the upper holder in plan view.

11 Claims, 9 Drawing Sheets

(51) Int. Cl.

| | |
|---|---|
| ***H01G 11/78*** | (2013.01) |
| ***H01M 50/213*** | (2021.01) |
| ***H01M 50/291*** | (2021.01) |

(56) References Cited

U.S. PATENT DOCUMENTS

2013/0141850 A1* 6/2013 Honda .................... H01G 4/38 361/679.01
2013/0344376 A1* 12/2013 Asaida ................ H01M 50/112 429/156
2021/0159549 A1 5/2021 Kurihara

FOREIGN PATENT DOCUMENTS

| | | |
|---|---|---|
| JP | 09-007564 | 1/1997 |
| JP | 2013-196810 | 9/2013 |
| KR | 10-2018-101668 A | 9/2018 |
| WO | 2012/124273 | 9/2012 |
| WO | 2019/208218 | 10/2019 |
| WO | 2020/154759 A1 | 8/2020 |

OTHER PUBLICATIONS

The EPC Office Action dated Dec. 20, 2024 for the related European Patent Application No. 22780352.5.
English Translation of Chinese Office Action dated Jun. 16, 2026 for the related Chinese Patent Application No. 202280021498.2.

* cited by examiner

POWER STORAGE MODULE

TECHNICAL FIELD

The present disclosure relates to a power storage module.

BACKGROUND ART

A power storage module is known as a power source including a plurality of power storage devices. When an impact is applied from the outside of the power storage module, a large load acts on the power storage device, the power storage device is largely deformed, and the safety of the power storage module may be impaired.

As a measure against the above problem, for example, in an energy storage module disclosed in PTL 1, a pipe holder is provided between adjacent power storage devices, and when an impact is applied from a side surface of the power storage module, the pipe holder does not move and the power storage device is not deformed.

CITATION LIST

Patent Literature

PTL 1: Unexamined Japanese Patent Publication No. 2013-196810

SUMMARY OF THE INVENTION

However, in the power storage module disclosed in PTL 1, the number of components is increased by providing the pipe holder.

An object of the present disclosure is to provide an energy storage module capable of suppressing deformation of an power storage device when an impact is applied from a side surface without increasing the number of components.

A power storage module according to one aspect of the present disclosure includes: at least one cylindrical power storage device; and a holder that holds one side or an other side of the power storage device along the axis of the power storage device. The holder includes a container that houses one end or an other end of the power storage device and a hole that penetrates the holder along the axis around the container. A distance between the container and the hole in plan view is smaller than a distance between the container and the adjacent container in plan view or a distance between the container and an edge of the holder in plan view.

According to one aspect of the present disclosure, when an impact is applied from a side surface of the power storage module, a portion between the hole and the container serves as a fracture starting point, and the entire holder is deformed. With such a configuration, an impact of the power storage module can be absorbed by the whole holder and hence, deformation of the power storage device can be suppressed. In other words, according to one aspect of the present disclosure, it is possible to suppress deformation of the power storage device when an impact is applied from the side surface without increasing the number of components. As a result, the safety of the power storage module is not impaired.

DESCRIPTION OF EMBODIMENT

Hereinafter, exemplary embodiments of the present disclosure will be described with reference to the drawings. Shapes, materials, and numbers to be described below are examples, and can be appropriately changed according to specifications of a power storage module.

Figure 1:
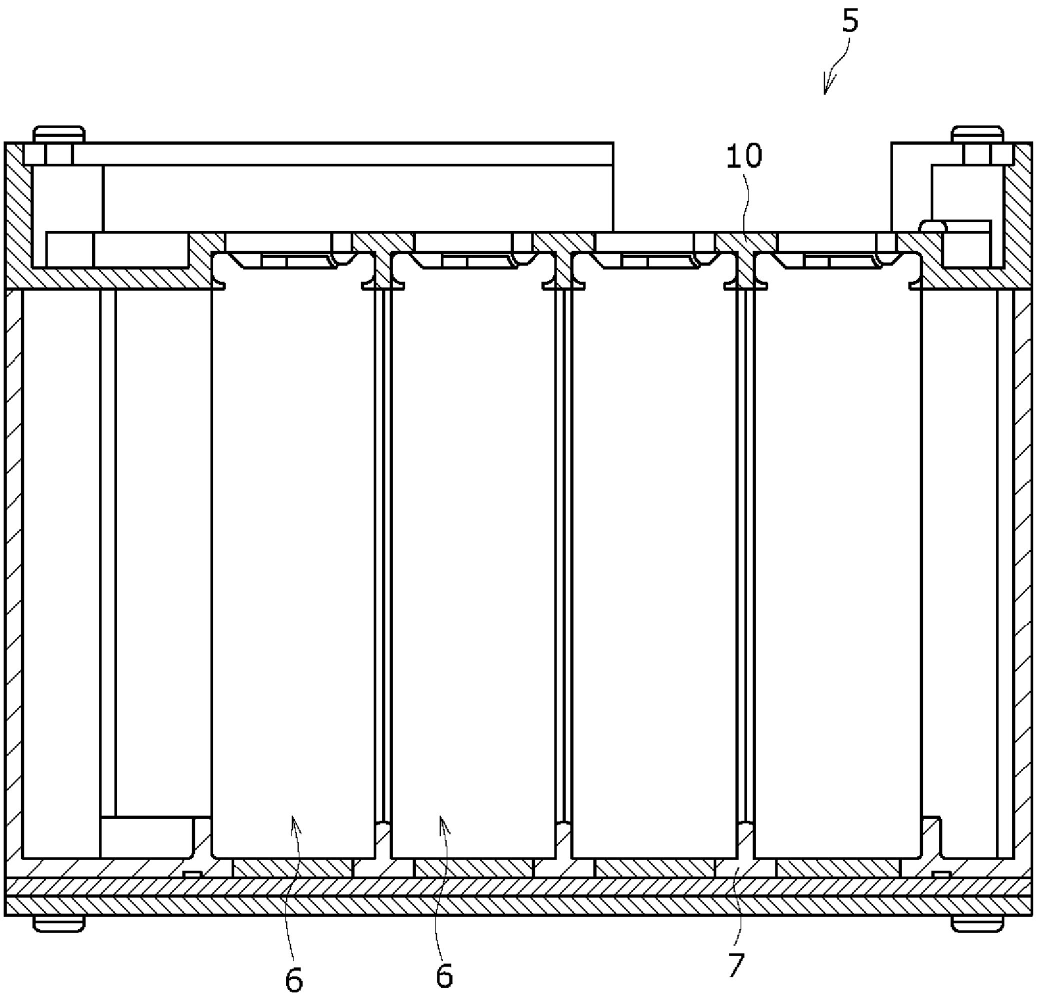
FIG. 1 is a side sectional view illustrating a power storage module according to an exemplary embodiment.

Power storage module 5 of an exemplary embodiment will be described with reference to FIG. 1. FIG. 1 is a side sectional view illustrating power storage module 5. Hereinafter, a side where upper holder 10 as a holder holds power storage device 6 with respect to power storage module 5 and power storage device 6 will be described as an upper side along the axis of the power storage device.

Power storage module 5 is mainly used as a power source for power. Power storage module 5 is used as a power source of an electric device driven by a motor such as an electric car, an electric power tool, an electric power-assisted bicycle, an electric motorcycle, an electric wheelchair, an electric tricycle, or an electric cart. However, the application of power storage module 5 is not limited, and power storage module 5 may be used as a power source of various electric devices used indoors and outdoors, such as a cleaner, a wireless device, a lighting device, a digital camera, and a video camera.

In FIG. 1, power storage module 5 includes a plurality of cylindrical power storage devices 6, upper holder 10 as a holder for holding axially upper sides of the plurality of power storage devices 6, and lower holder 7 for holding lower sides of the plurality of power storage devices 6.

In this example, a cylindrical lithium ion secondary battery is used as power storage device 6, but power storage device 6 may be a nickel-metal hydride battery, a capacitor or the like. Power storage device 6 includes, for example, an electrode group in which a strip-shaped positive electrode and a strip-shaped negative electrode are wound in with a strip-shaped separator interposed therebetween, a cylindrical outer covering can containing the electrode group together with an electrolyte solution, a sealing body sealing an opening of the outer covering can in an insulated state, a foil-shaped positive electrode lead electrically connecting a positive electrode and the sealing body, and a negative electrode lead electrically connecting a negative electrode and the outer covering can. An insulating gasket may be disposed between an outer periphery of the sealing body and an inner peripheral surface of the opening of the outer covering can.

An annular groove is formed near the opening of the outer peripheral surface of the outer covering can. The groove is formed as an annular protrusion on the inner peripheral surface of the outer covering can. The gasket and the sealing body are disposed on the annular protrusion in the outer covering can. Further, the opening end of the outer covering can is swaged to fall down toward an inside of the outer covering can in a state where the gasket is disposed on an inner peripheral side. The sealing body is sandwiched by the swaged opening end and the convex portion along the axis of the power storage device through the gasket and thus the opening of the outer covering can is sealed.

Sealing body may be provided with a current interruption mechanism (CID) or an exhaust valve that ruptures when the inside of outer covering can reaches a predetermined pressure or more. In addition, an insulating plate for insulating the electrode group from the outer covering can may be provided between the electrode group and the bottom of the outer covering can or between the electrode group and the protrusion (groove). When the insulating plate is provided, the positive electrode lead may extend through a through-hole formed in the insulating plate. The negative electrode lead may pass through the through-hole formed in the insulating plate or may extend while bypassing the insulating plate.

In an upper part of power storage device 6, a positive electrode terminal is formed on a top surface of the sealing body, and a negative electrode terminal is disposed toward an upper end portion (swaged opening end) of the outer covering can. The electrode groups may be connected such that the outer covering can functions as a positive electrode terminal and the sealing body functions as a negative electrode terminal.

A plurality of power storage devices 6 are densely filled in power storage module 5 in consideration of safety, and adjacent power storage devices 6 are arranged substantially close to each other. In power storage device 6, for example, in plan view, six power storage devices 6 are arranged so as to surround one power storage device 6 (hereinafter, staggered arrangement). The plurality of power storage devices 6 may be connected in series or in parallel to each other through a conductive current collector (not illustrated) disposed near upper holder 10. At this time, the position where the lead extending from the current collector is connected to the power storage device may be the top surface of the sealing body as the positive electrode terminal and the opening end of the swaged outer covering can as the negative electrode terminal. The bottom of the outer covering can positioned on the lower side of the power storage device as the negative electrode terminal may be connected to the lead of the current collector through the opening of lower holder 7.

As described above, upper holder 10 holds the upper side of the plurality of power storage devices 6. Upper holder 10 is made of thermoplastic resin. The thermoplastic resin is roughly classified into general-purpose plastics and engineering plastics, and polyethylene, polypropylene, polyamide, ABS, and the like are used. Details of upper holder 10 will be described later.

As described above, lower holder 7 holds the lower sides of the plurality of power storage devices 6. Similarly to upper holder 10, lower holder 7 is formed of, for example, thermoplastic resin. Although some exemplary embodiments of upper holder 10 will be described below, lower holder 7 may have a similar configuration, and both upper holder 10 and lower holder 7 may have a similar configuration. In the power storage module of the present disclosure, an intermediate holder may be provided between upper holder 10 and lower holder 7. The intermediate holder has a container that is a through hole at a position corresponding to the containers of upper holder 10 and lower holder 7. The following configuration of upper holder 10 can also be applied to an intermediate holder.

Figure 2:
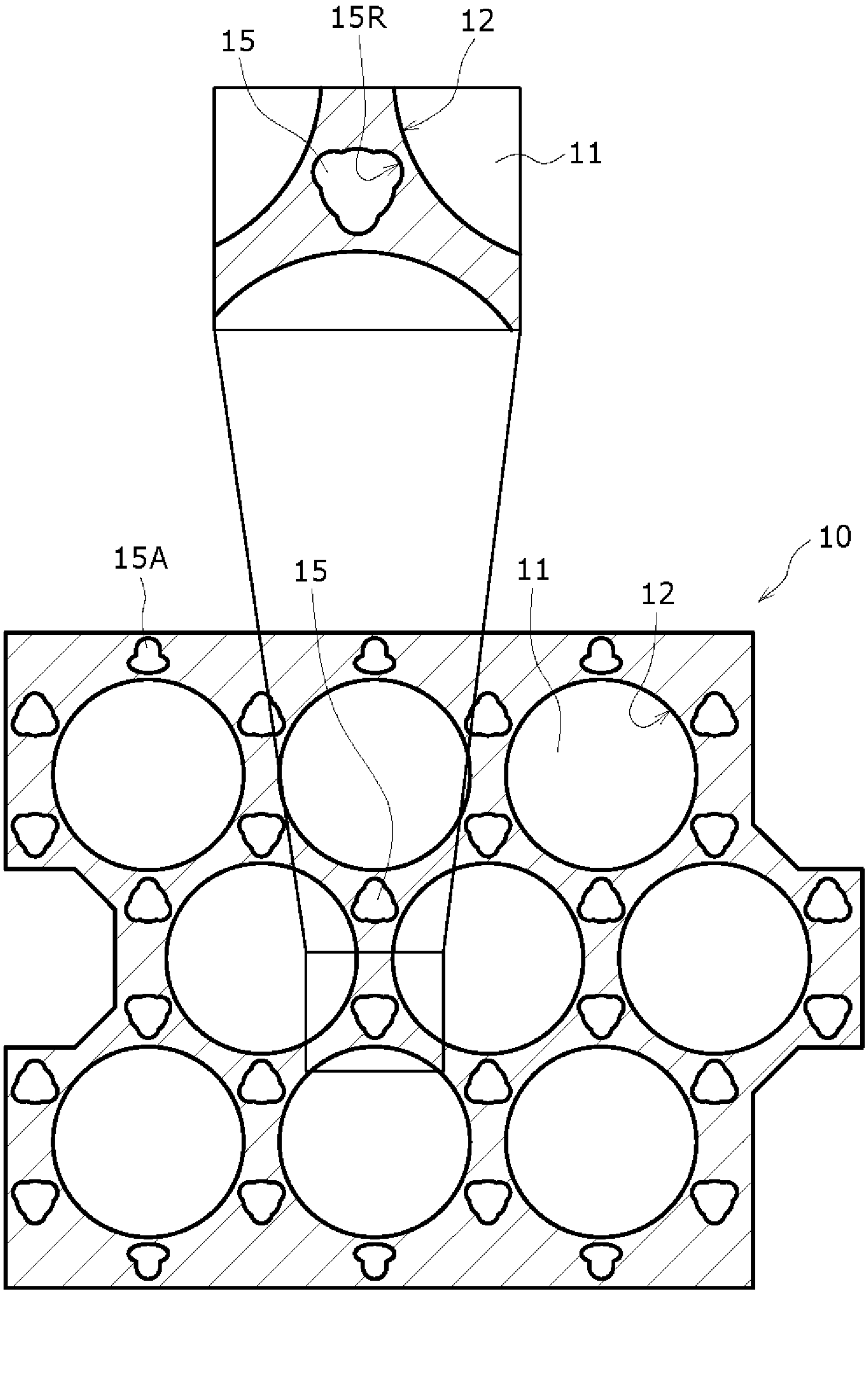
FIG. 2 is a cross-sectional view and a partially enlarged view illustrating an upper holder according to an example of the exemplary embodiment.

Upper holder 10 as an example of the exemplary embodiment will be described with reference to FIG. 2. FIG. 2 is a cross-sectional view and a partially enlarged view illustrating upper holder 10.

Upper holder 10 has a bottom surface facing lower holder 7, and has a plurality of containers 11 formed on the bottom surface and in which part near upper ends of respective power storage devices 6 are housed, and holes 15 formed so as to penetrate the containers 11 along the axis of the power storage device.

An upper end of power storage device 6 is fitted to container 11. With such a configuration, the upper end of power storage device 6 is held by upper holder 40. Container 11 includes a ceiling having a bottom surface facing an upper end surface of power storage device 6 and wall 12 having an inner peripheral surface facing a side peripheral surface of power storage device 6.

Holes 15 are formed at equal intervals (for example, at 60° intervals) along the periphery of the container 11 in plan view. In other words, since the containers 11 (the power storage devices 6) are arranged in a staggered manner, the holes 15 are formed between the three containers 11 in plan view. hole 15 is a through hole having a substantially triangular prism shape, and is formed such that each corner 15R faces each adjacent container 11. Corner 15R is formed in an R shape. In addition, hole 15A formed along the edge located at the outermost periphery of the bottom surface of upper holder 10 among the holes 15 has an opening area smaller than that of the other holes 15. Here, "facing the container" means that the edge of the opening forming the hole extends so as to approach container 11.

The distance between container 11 and hole 15 in plan view is smaller than the distance between container 11 and adjacent container 11 in plan view or the distance between container 11 and the edge of upper holder 10 in plan view. In other words, in plan view of upper holder 10, a portion between corner 15R of hole 15 and container 11 is the thinnest portion of the region of upper holder 20. Note that, in a case where each distance here can take a plurality of values, the distance is a minimum value of the plurality of values.

According to upper holder 10, when an impact is applied from the side surface of power storage module 5, the region between corner 15R of hole 15, which is the thinnest in plan view of upper holder 10, and container 11 is broken as a fracture starting point, and the entire upper holder 10 is deformed. With such a configuration, an impact of power storage module 5 can be absorbed by upper holder 10 and hence, deformation of power storage device 6 can be suppressed. In other words, deformation of power storage device 6 can be suppressed when an impact is applied from the outside of power storage module 5 (for example, a side surface of power storage module 5) without increasing the number of parts. As a result, the safety of power storage module 5 is not impaired. In addition, by making hole 15A formed at the edge of the bottom surface of upper holder 10 smaller in opening area than other holes 15, rigidity of the periphery of upper holder 10 can be improved.

Figure 3:
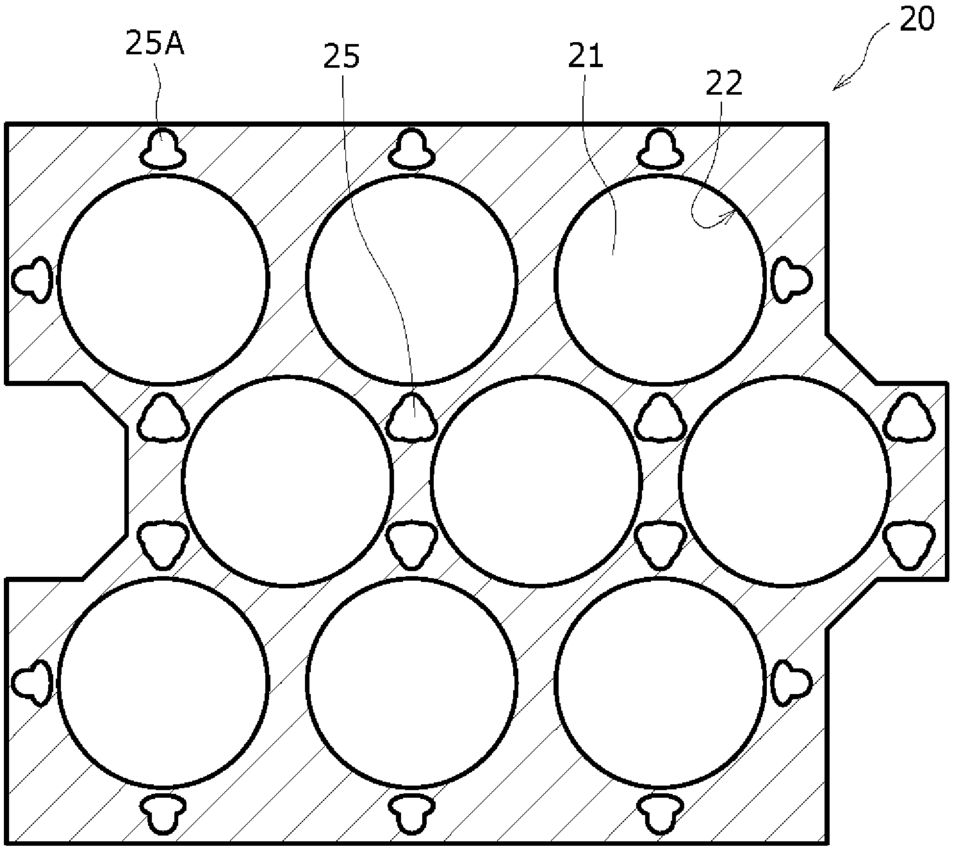
FIG. 3 is a cross-sectional view illustrating an upper holder according to another example of the exemplary embodiment.

Upper holder 20 as an example of the exemplary embodiment will be described with reference to FIG. 3. FIG. 3 is a cross-sectional view of upper holder 20.

In upper holder 20, holes 25 are formed at equal intervals (for example, at 180° intervals in the respective containers constituting the rows at both ends) along the periphery of container 21 in plan view. In the edge of upper holder 20, hole 25A is formed at a position where a distance between the edge and container 21 is minimized. Hole 25A is smaller in opening area than other holes 25. Configurations (wall 22 and the like) other than these are similar to those of upper holder 10 described above, and thus the description thereof is omitted. With such a configuration, the number of holes 25 and 25A surrounding one container among the plurality of containers 21 is different. Therefore, when an external force is applied to the holder, it is possible to change the movable direction of the power storage device housed in each container and the ease of deformation of the container.

According to upper holder 20, similarly to upper holder 10 described above, the impact of power storage module 5 can be absorbed by upper holder 20, and the deformation of power storage device 6 can be suppressed.

Figure 4:
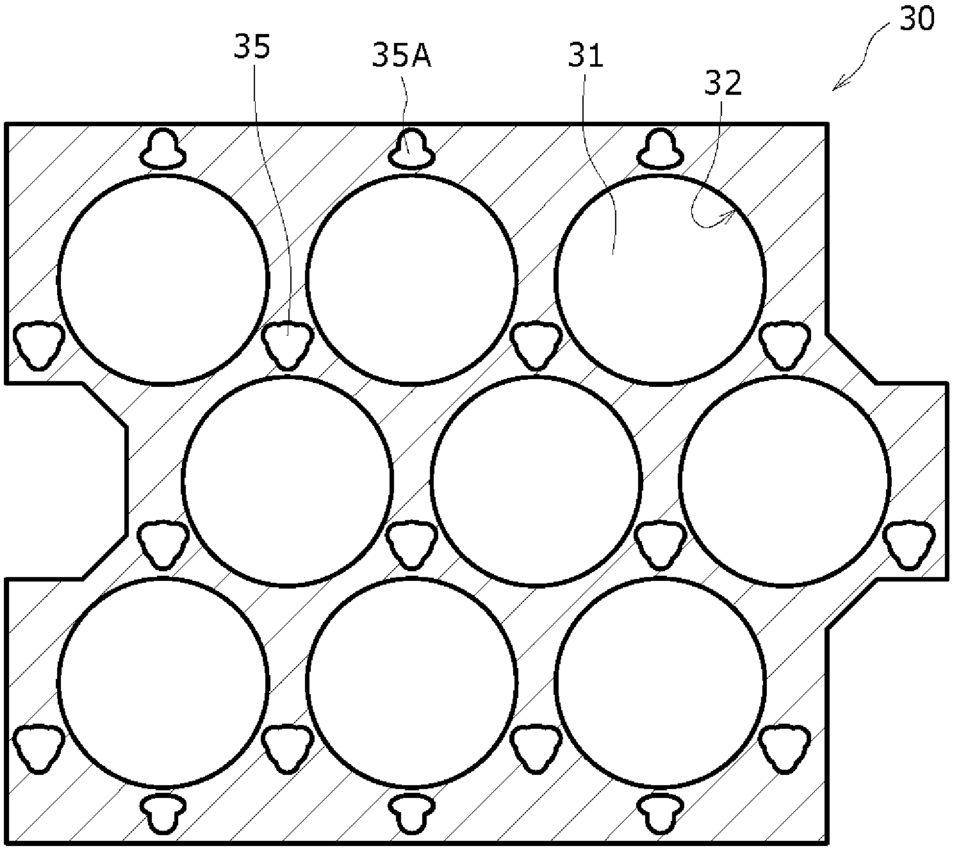
FIG. 4 is a cross-sectional view illustrating an upper holder according to another example of the exemplary embodiment.

Upper holder 30 as an example of the exemplary embodiment will be described with reference to FIG. 4. FIG. 4 is a cross-sectional view of upper holder 30.

In upper holder 30, holes 35 are formed at equal intervals (for example, at 120° intervals) along the periphery of container 31 in plan view. In the edge of upper holder 30, hole 35A is formed at a position where a distance between the edge and container 31 is minimized. Hole 35A is smaller in opening area than other holes 35. Configurations (wall 32 and the like) other than these are similar to those of upper holder 10 described above, and thus the description thereof is omitted. With such a configuration, in the container of the lowermost row in FIG. 4, holes 35 and holes 35A are non-uniformly arranged with respect to the circumferential direction of the container. When holes 35 and holes 35A are arranged non-uniformly, the power storage device can easily move to a place where the holes are arranged densely. Therefore, the container in the lowermost row easily restricts the moving direction when an external force is applied to upper holder 30. Further, in FIG. 3, it can be said that the container in the lowermost row is more fragile than the container in the uppermost row between the container in the uppermost row and the container in the lowermost row.

According to upper holder 30, similarly to upper holder 10 described above, the impact of power storage module 5 can be absorbed by upper holder 30, and the deformation of power storage device 6 can be suppressed.

Figure 5:
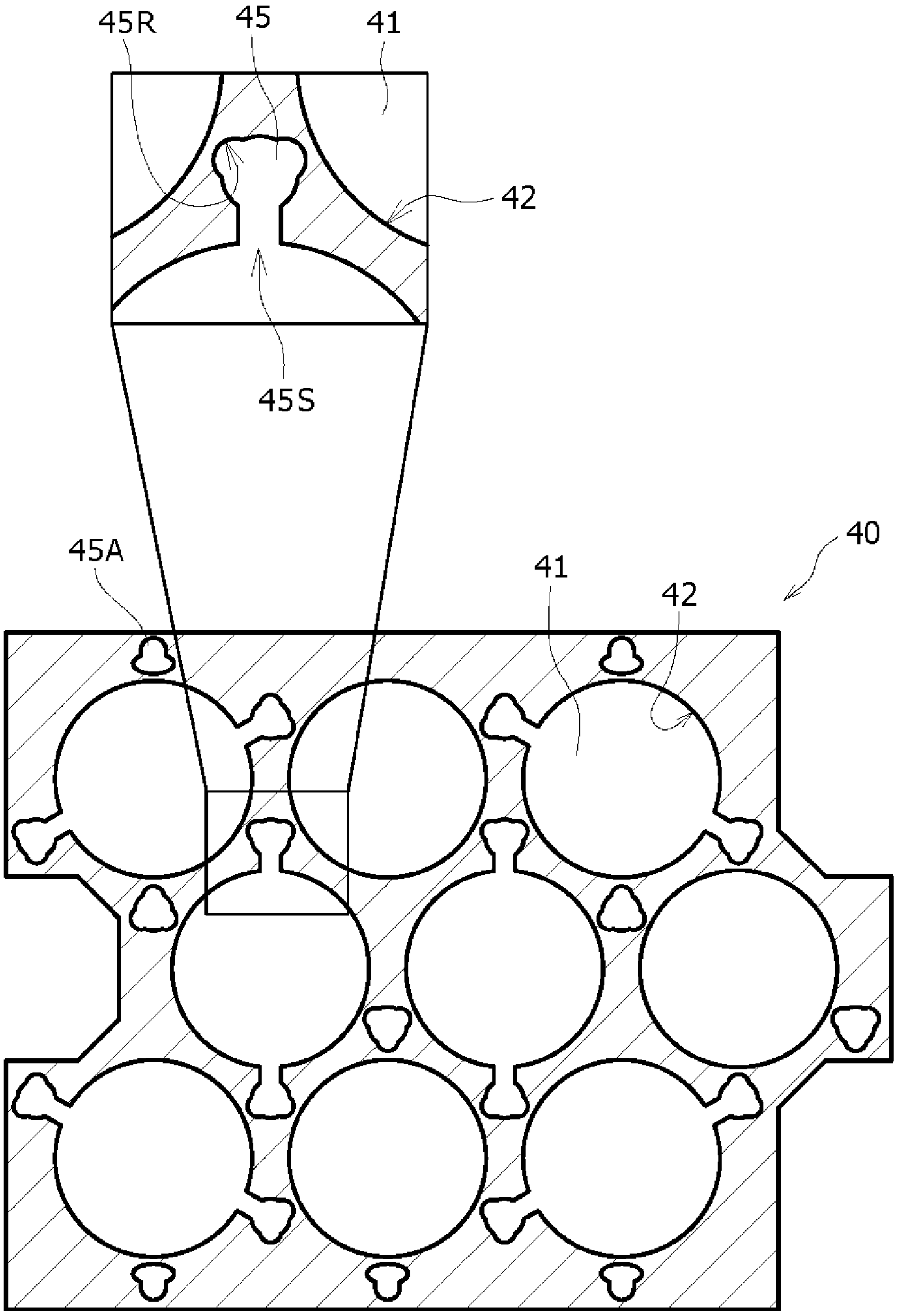
FIG. 5 is a cross-sectional view and a partially enlarged view illustrating an upper holder according to another example of the exemplary embodiment.

Upper holder 40 as an example of the exemplary embodiment will be described with reference to FIG. 5. FIG. 5 is a cross-sectional view and a partially enlarged view illustrating upper holder 40.

Upper holder 40 has a bottom surface facing lower holder 7, and has a plurality of containers 41 formed on the bottom surface and in which part near upper ends of the respective power storage devices 6 are housed, and holes 45 formed so as to penetrate the containers 41 along the axis of the power storage device. Container 41 includes wall 42 having an inner peripheral surface facing a side peripheral surface of power storage device 6.

Holes 45 are formed at equal intervals (for example, at 180° intervals) along the periphery of container 41 in plan view. Hole 45 is a through hole having a substantially triangular prism shape, and is formed such that each corner 45R faces each adjacent container 41. Corner 45R is formed in an R shape. One of corners 45R communicates with adjacent container 41 to form communicating part 45S. In the circumferential direction of hole 45, the portion where communicating part 45S is formed can be more easily deformed than the portion where communicating part 45S of hole 45 is not provided. Therefore, in hole 45, the ease of deformation of hole 45 can be controlled by the presence or absence of communicating part 45S. Further, communicating part 45S may be narrower in hole 45 than a portion other than communicating part 45S (may have a shape narrowed by communicating part 45S). With such a configuration, a holding force of power storage device 6 of container 45 in a normal state is enhanced. In addition, hole 45A formed along the edge located at the outermost periphery of the bottom surface of upper holder 10 among holes 45 has an opening area smaller than that of other holes 45.

The distance between container 41 and hole 45 in plan view is smaller than the distance between container 41 and adjacent container 41 in plan view or the distance between container 41 and the edge of upper holder 40 in plan view. In other words, a region between corner 45R of hole 45 and container 41 in plan view of upper holder 40 is the thinnest portion of upper holder 40.

According to upper holder 40, similarly to upper holder 10 described above, the impact of power storage module 5 can be absorbed by upper holder 40, and the deformation of power storage device 6 can be suppressed.

Figure 6:
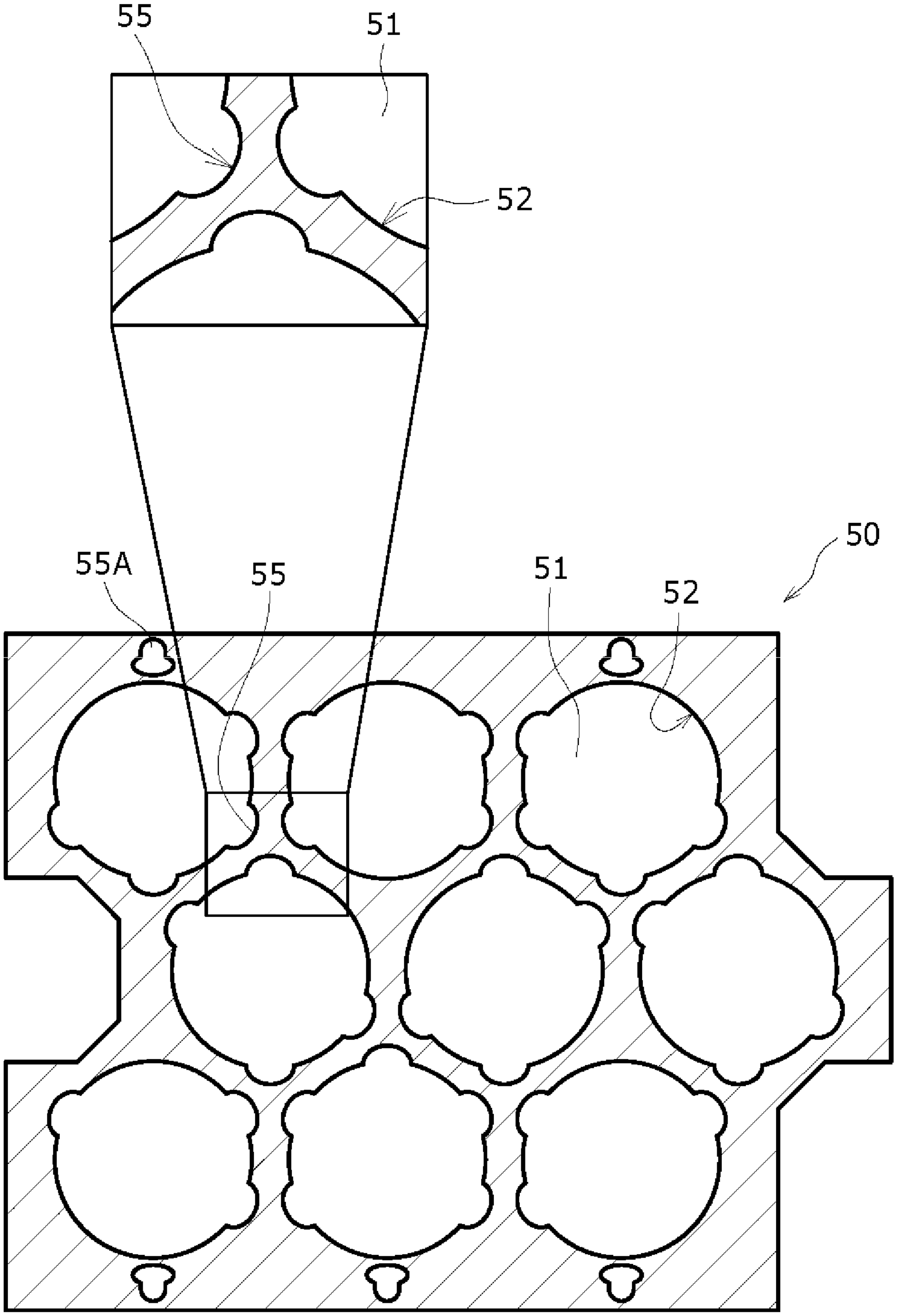
FIG. 6 is a cross-sectional view and a partially enlarged view illustrating an upper holder according to another example of the exemplary embodiment.

Upper holder 50 as an example of the exemplary embodiment will be described with reference to FIG. 6. FIG. 6 is a cross-sectional view and a partially enlarged view illustrating upper holder 50.

Upper holder 50 has a bottom surface facing lower holder 7, and a plurality of containers 51 formed on the bottom surface and housing near upper ends of respective power storage devices 6 are formed. A part near an upper end of power storage device 6 is fitted to container 51. With such a configuration, the part near the upper end of power storage device 6 is held by upper holder 50.

Container 51 includes a ceiling having a bottom surface facing an upper end surface of power storage device 6 and wall 52 having an inner peripheral surface facing a side peripheral surface of power storage device 6. Wall 52 includes recess 55 formed along the axis of the power storage device.

The recesses 55 are formed at equal intervals (for example, at 60° intervals) along the periphery of container 51 in plan view. In other words, since containers 51 (power storage devices 6) are arranged in a staggered manner, recess 55 is formed between three containers 51 in plan view. Recess 55 has a substantially semi-elliptical shape and is formed so as to face the outside of container 51. In addition, hole 55A is formed along an edge located at the outermost periphery of the bottom surface of upper holder 50.

The distance between recess 55 and adjacent recess 55 in plan view is shorter than the distance between container 51 and adjacent container 51 in plan view or the distance between container 51 and the edge of upper holder 50 in plan view. In other words, the region between recess 55 and recess 55 adjacent in plan view of upper holder 50 is the thinnest portion of upper holder 50.

According to upper holder 50, when an impact is applied from a side surface of power storage module 5, a region between recess 55 and recess 55 adjacent to each other, which is the thinnest in plan view of upper holder 50, is broken as a fracture starting point, and entire upper holder 50 is deformed. With such a configuration, an impact of power storage module 5 can be absorbed by upper holder 50 and hence, deformation of power storage device 6 can be suppressed. As a result, the safety of power storage module 5 is not impaired. In addition, in some of the containers of upper holder 50, recess 55 is arranged unevenly. By arranging the recesses unevenly in this manner, a portion where the recesses are densely arranged is more easily deformed than a portion where the recesses are sparse. By controlling the density of the recesses, the direction in which container 51 is deformed and the direction in which power storage device 6 moves may be controlled.

Figure 7:
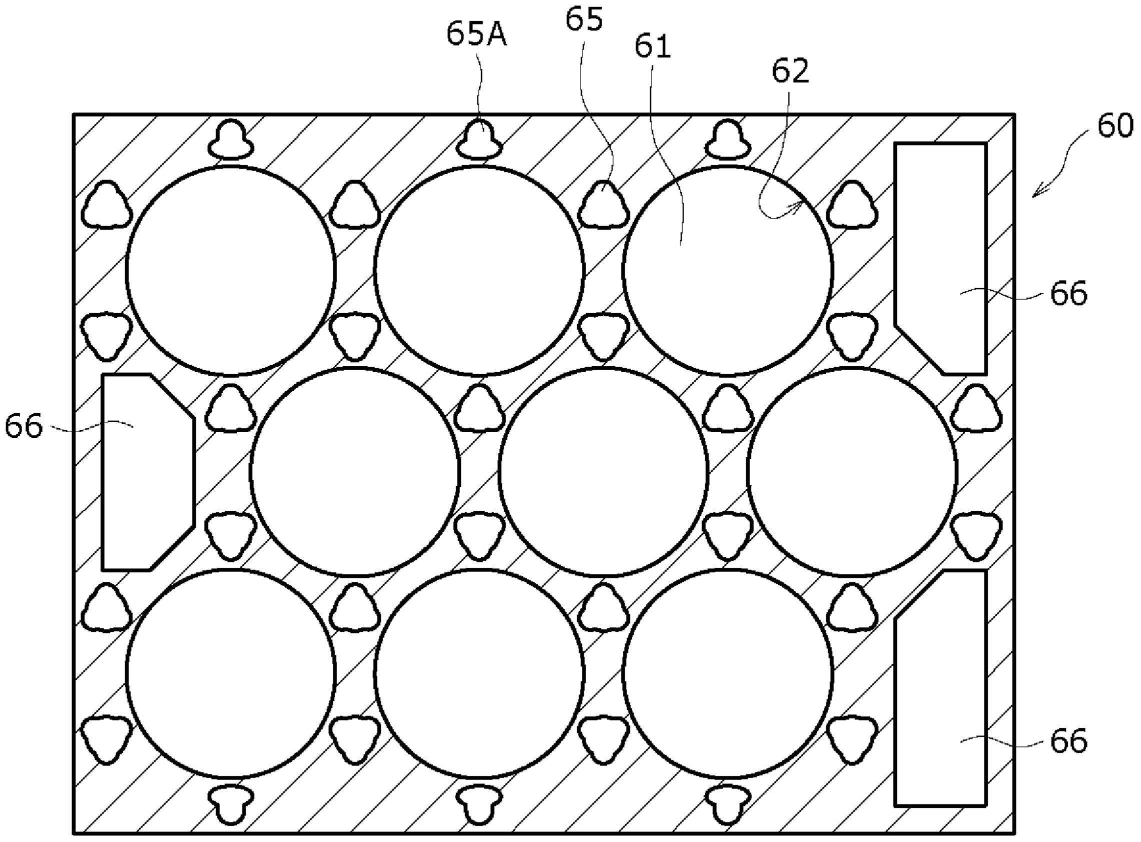
FIG. 7 is a cross-sectional view illustrating an upper holder according to another example of the exemplary embodiment.

Upper holder 60 as an example of the exemplary embodiment will be described with reference to FIG. 7. FIG. 7 is a cross-sectional view of upper holder 60.

In upper holder 60, gap 66 is formed at an edge. Gap 66 is formed in a portion where the thickness of a region such as a corner of upper holder 60 increases. Other configurations (container 61, wall 62, hole 65, hole 65A, and the like) are the same as those of upper holder 10 described above, and thus the description thereof will be omitted.

According to upper holder 60, similarly to upper holder 10 described above, the impact of power storage module 5 can be absorbed by upper holder 20, and the deformation of power storage device 6 can be suppressed. Further, as compared with upper holder 10, an edge of upper holder 60 protrudes outward due to gap 66. Since the edge protrudes, rigidity of the upper holder is enhanced. Further, since gap 66 is provided, when a force is applied from the outside of upper holder 60, it is possible to preferentially break before the force is transmitted to the container, and to perform a function of weakening the force transmitted to the container (buffering function). Further, gap 66 provided on the side opposite to the side where the external force is applied can be a space where power storage device 6 which moves in upper holder 60 by the external force enters gap 66 to weaken the force applied to power storage device 6.

Figure 8:
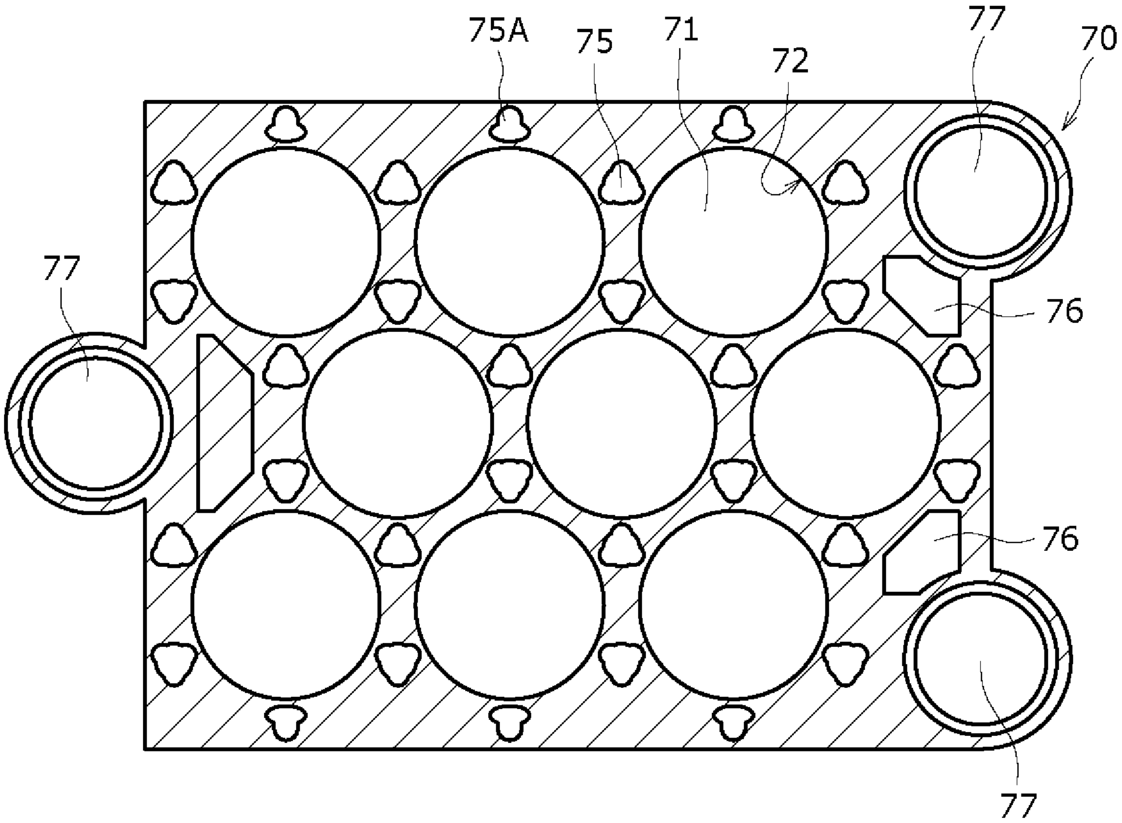
FIG. 8 is a cross-sectional view illustrating an upper holder according to another example of the exemplary embodiment.

Upper holder 70 as an example of the exemplary embodiment will be described with reference to FIG. 8. FIG. 8 is a cross-sectional view of upper holder 70.

In upper holder 70, fixing part 77 is formed at an edge. Fixing part 77 is a portion to which a bolt, a nut, or the like for fixing upper holder 70 is screwed. Fixing part 77 is suitably provided, for example, in a region such as a corner of upper holder 70. In upper holder 70, gap 76 having the same function as upper holder 60 is formed. Gap 76 is formed in a portion having a large thickness such as a region between fixing part 77 of upper holder 70 and storage portion 71. Other configurations (container 71, wall 72, hole 75, hole 75A, and the like) are the same as those of upper holder 10 described above, and thus the description thereof will be omitted.

According to upper holder 70, similarly to upper holder 10 described above, the impact of power storage module 5 can be absorbed by upper holder 20, and the deformation of power storage device 6 can be suppressed. Further, fixing part 77 has higher rigidity than upper holder 70 in which a portion of upper holder 10 where fixing part 77 is provided is recessed. In addition, the rigidity of upper holder 70 can be further enhanced by using a material having high rigidity different from that of the upper holder for the threaded portion for screwing the bolt and the nut into fixing part 77.

Figure 9:
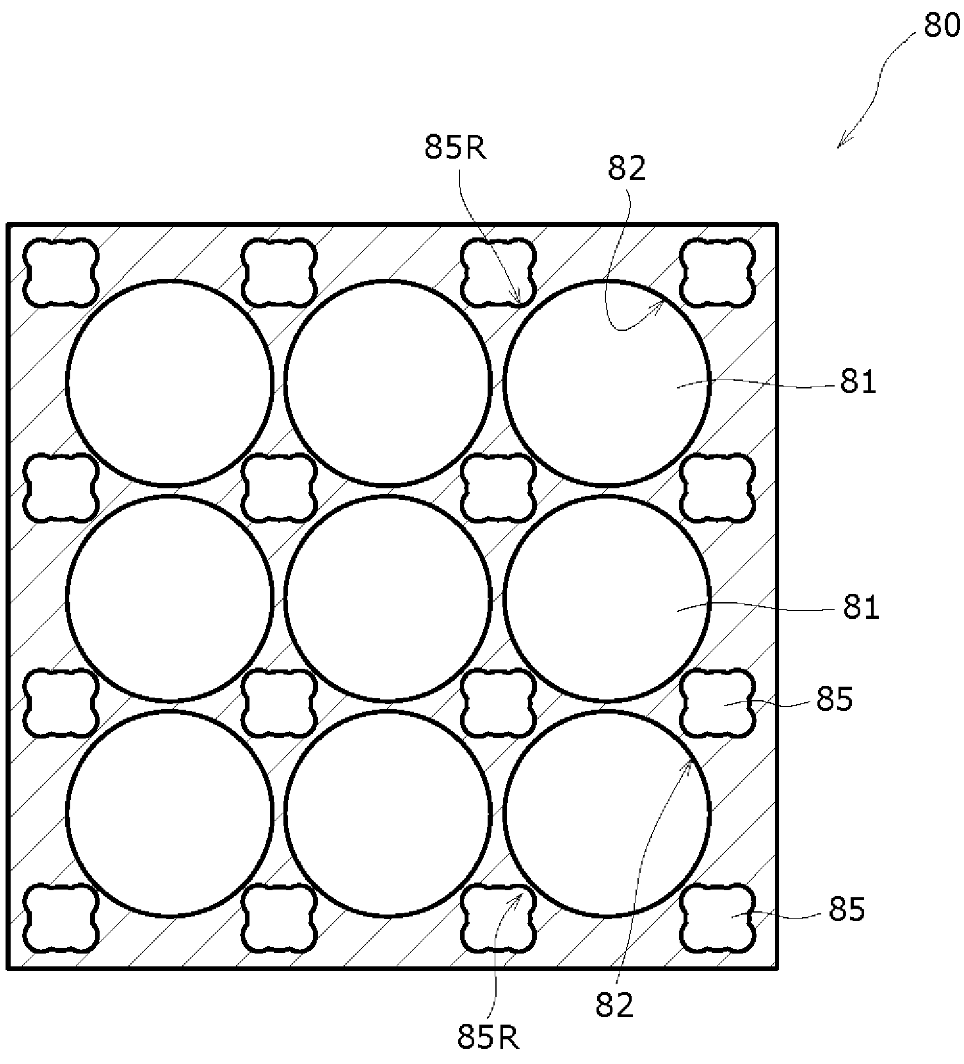
FIG. 9 is a cross-sectional view illustrating an upper holder according to another example of the exemplary embodiment.

Upper holder 80 as an example of the exemplary embodiment will be described with reference to FIG. 9. FIG. 9 is a cross-sectional view of upper holder 80.

Upper holder 80 has a bottom surface facing lower holder 7, and has a plurality of containers 81 formed on the bottom surface and in which parts near upper ends of the respective power storage devices 6 are housed, and holes 85 formed so as to penetrate the containers 81 along the axis of the power storage device. In this example, eight containers 81 are formed so as to surround the periphery of one container 81. Container 81 includes wall 82 having an inner peripheral surface facing a side peripheral surface of power storage device 6.

Holes 85 are formed at equal intervals (for example, at 90° intervals) along the periphery of the container 81 in plan view. Hole 85 is a through hole having a substantially quadrangular prism shape, and is formed such that each corner 85R faces each adjacent container 81. Corner 85R is formed in an R shape.

The distance between container 81 and hole 85 in plan view is smaller than the distance between container 81 and adjacent container 81 in plan view or the distance between container 81 and the edge of upper holder 80 in plan view. In other words, a region between corner 85R of hole 85 and container 81 in plan view of upper holder 80 is the thinnest portion of upper holder 80.

According to upper holder 80, similarly to upper holder 10 described above, the impact of power storage module 5 can be absorbed by upper holder 80, and the deformation of power storage device 6 can be suppressed.

The hole described in the above embodiment is preferably a through hole, but may be a hole having a bottom. In addition, the hole arranged at the edge of the holder may not have a shape in which the width of the portion near the container (dimension in the direction perpendicular to the direction from the hole toward the container) is long. The part near the edge and the part near the container may have the same width. The width of the part near the edge may be larger than the width of the part near the container. The shape of the inner edge of the corner of the hole may not be an R shape. For example, the corner may be constituted by a plurality of straight lines and may have a vertex by two adjacent straight lines.

Note that the present invention is not limited to the above-described exemplary embodiments and modified examples thereof, and it is a matter of course that various changes and improvements can be made within the scope of the matters described in the claims of the present application.

REFERENCE MARKS IN THE DRAWINGS

5 power storage module
6 power storage device
7 lower holder
10 upper holder
11 container
12 wall
15 hole
15A hole
15R corner
20 upper holder
21 container
22 wall
25 hole
25A hole
30 upper holder
31 container
32 wall
35 hole
35A hole
40 upper holder
41 container 42 wall
45 hole
45A hole
45R corner
45S communicating part
50 upper holder
51 container
52 wall
55 recess
55A hole
60 upper holder
61 container
62 wall
65 hole
65A gap
66 gap
70 upper holder
71 storage portion
72 wall
75 hole
75A gap
76 empty wall
77 fixed part
80 upper holder
81 container
82 wall
85 hole
85R corner

The invention claimed is:

1. A power storage module comprising:
a plurality of power storage devices each having a cylindrical shape; and
a holder that holds the plurality of power storage devices along respective axes of the plurality of power storage devices, wherein
the holder includes (i) containers that respectively house the plurality of power storage devices and (ii) holes that penetrate the holder along the axes around the containers, and
a distance between a container among the containers and a hole among the holes in plan view is smaller than a distance between adjacent containers among the containers in plan view or a minimum distance between an edge located at an outermost periphery of the holder and an outermost point of a container among the containers closest to the edge in plan view,
the holes include (1) an outermost hole provided between the edge located at the outermost periphery of the holder and the outermost point of the container among the containers closest to the edge and (2) other holes, and
the outermost hole includes an opening area smaller than an opening area of each of the other holes.

2. The power storage module according to claim 1, wherein the hole among the holes communicates with one of the containers which is adjacent to the hole among the holes.

3. The power storage module according to claim 1, wherein the holder includes the holes provided at equal intervals along a periphery of the container among the containers.

4. The power storage module according to claim 1, wherein the hole among the holes includes a substantially triangular shape in plan view, a corner of the hole among the holes being provided to face the container among the containers.

5. The power storage module according to claim 1, wherein the hole among the holes includes a substantially quadrangular shape in plan view, a corner of the hole among the holes being provided to face the container among the containers.

6. The power storage module according to claim 1, wherein
in plan view, the outermost hole is positioned between the edge located at the outermost periphery of the holder and the container among the containers, and
in plan view, the outermost hole is located outside a space between adjacent containers among the containers.

7. The power storage module according to claim 1, wherein, in plan view, the outermost hole is positioned on an imaginary line extending perpendicularly from a center of the container closest to the edge among the containers.

8. A holder for holding a plurality of power storage devices each having a cylindrical shape along respective axes of the plurality of power storage devices, the holder comprising:
containers each housing a corresponding one of the plurality of power storage devices and
holes that penetrate the holder along the respective axes around the containers, and
a distance between a container among the containers and a hole among the holes in plan view is smaller than a distance between adjacent containers among the containers in plan view or a minimum distance between an edge located at an outermost periphery of the holder and an outermost point of a container among the containers closest to the edge in plan view
the holes include (1) an outermost hole provided between the edge located at the outermost periphery of the holder and the outermost point of the container among the containers closest to the edge and (2) other holes, and
the outermost hole includes an opening area smaller than an opening area of each of the other holes.

9. The holder according to claim 8, wherein
in plan view, the outermost hole is positioned between the edge located at the outermost periphery of the holder and the container among the containers, and
in plan view, the outermost hole is located outside a space between adjacent containers among the containers.

10. The holder according to claim 8, wherein, in plan view, the outermost hole is positioned on an imaginary line extending perpendicularly from a center of the container closest to the edge to the edge among the containers.

11. A power storage module comprising:
a plurality of power storage devices in a shape of a cylinder; and
a holder that holds a first side or a second side of each of the plurality of power storage devices along respective axes of the plurality of power storage devices, wherein
the holder includes a plurality of containers, each of which houses a first end or a second end of a corresponding one of the plurality of power storage devices,
each of the plurality of containers includes a wall facing a side peripheral surface of the corresponding one of the plurality of power storage devices,
the wall includes recesses along a corresponding one of the respective axes,
the recesses are arranged within the holder such that, in plan view, distances between adjacent recesses among the recesses along circumferential directions of the containers are nonuniform, and
a facing distance, in plan view, between a first recess among the recesses of a first container among the containers and a second recess closest to the first recess among the recesses of a second container adjacent to the first container among the containers is smaller than a distance between adjacent containers among the containers in plan view or a distance between each of the containers and an edge of the holder in plan view.

* * * * *